United States Patent Office 3,810,858
Patented May 14, 1974

3,810,858
METHOD FOR RECOVERING POLYAMIDE ACID VALUES FROM DETERIORATED DISPERSIONS OF POLYAMIDE ACID
Edith M. Boldebuck, Schenectady, N.Y., assignor to General Electric Company
No Drawing. Filed Dec. 13, 1971, Ser. No. 207,519
Int. Cl. C08g 20/32
U.S. Cl. 260—29.2 N                    5 Claims

ABSTRACT OF THE DISCLOSURE

A method is provided for recovering polyamide acid values from deteriorated polyamide acid dispersions useful for electrocoating conducting substrates. Solids which have been mechanically separated by conventional means from such deteriorated aqueous polyamide acid dispersions can be employed to make useful polyamide acid mixtures.

---

The present invention relates to a method for recovering polyamide acid values from deteriorated polyamide acid dispersions and products obtained thereby.

Prior to the present invention polyamide acid mixtures as shown by Holub et al., Pat. 3,507,765, were useful for making composite structures of polyimide film in metal substrates by effecting the electrodeposition of the polyamide acid onto the metal substrate followed by heating the polyamide acid to the polyimide state. Experience has shown that aqueous dispersions of polyamide acid which have been partially neutralized for electrocoating purposes having a significant number of un-neutralized polyvalent amide acid units having the characteristic configuration, (1) 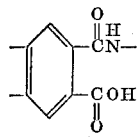

where the unsatisfied valence bonds can be joined to monovalent or polyvalent radicals, such as hydrogen, carboxy, imido, carbon-amide, etc., usually have a tendency to degrade when allowed to remain at ambient temperatures, such as a temperature in the range of from about 25° C. to about 35° C.

As used hereinafter the term degrade, degradation, etc. when applied to defining a change in characteristics of polyamide acid dispersion defined herein, signifies a lowering of the ability of the polyamide acid to form an electrodeposit having at least 20% by weight solids. The term "mechanical separation" signifies the use of a gravitational or centrifugal field, filtration by gravity or under pressure, gravitational settling followed by decantation, etc. to effect the separation of dispersed solids from the aqueous polyamide dispersion.

One method of retarding the degradation rate of such polyamide acid is to add a neutralizing amount of base to the dispersion thereby effecting the neutralization of all of the available units of Formula 1, to produce polyamide acid consisting essentially of polyvalent units having the characteristic configuration, (2) 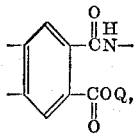

where Q is a base anion, such as an ammonium radical, and the unsatisfied valences can be satisfied by radical as previously defined, etc. Although base neutralization of polyamide acid has been found to substantially improve the shelf stability of polyamide acid electrocoating mixtures, those skilled in the art know that satisfactory film builds of electrodeposited polyamide acid onto metal substrates, such as at least 0.010 g. polymer solids per coulomb, referred to sometimes as "coulomb yield," can only be achieved, if the degree of neutralization of Formula 1 units is sufficient to provide for a range of from 0.1 to 1.0 meq. of base/g. of polymer solids.

The present invention is based on the discovery that polyamide acid values can be salvaged from deteriorated aqueous dispersion of polyamide acids which have been allowed to degrade rendering them incapable of providing at least 20% by weight of solids in the wet electrodeposit. The deteriorated polyamide acid dispersions consisting essentially of a liquid phase and a dispersed phase can be rectified by conventional mechanical separation techniques. The solids can thereafter be readily recovered from the liquid phase. Surprisingly, it has been found that the recovered solids are useful polyamide acid, even though the aqueous polyamide acid dispersion has severely degraded at ambient temperature after extensive shelf periods. The recovered solids can be used to make aqueous polyamide acid electrocoating mixtures, such as solutions or dispersions providing satisfactory solids content in the electrodeposit as previously defined.

There is provided by the present invention, a method for recovering polyamide acid values from deteriorated aqueous dispersions of such polyamide acid consisting essentially of a liquid phase and a dispersed phase which comprises (1) effecting the mechanical separation of the liquid phase from the dispersed phase of the deteriorated aqueous polyamide acid dispersion (2) recovering therefrom the resulting separated dispersed phase, and (3) employing said recovered dispersed phase of (2) to make an electrocoatable polyamide acid mixture.

The dispersed solids recovered in accordance with the present invention can be obtained from deteriorated polyamide acid mixtures of the prior art. These mixtures are generally made by effecting reaction between substantially equal molar amounts of organic anhydride and organic diamine in a polar aprotic solvent chemically inert to the reactants during the reaction. After the polyamide acid solution has been formed, there can be added water along with a suitable base, which preferably can be added prior to, or simultaneously with the addition of water to produce an aqueous dispersion of the polyamide acid. The resulting aqueous dispersion, can consist of from 1% to 15% by weight of polymer solids and a proportion of from 30 to 90 parts of water, per part of solvent.

Included among the organic anhydride which can be employed to make the polyamide acid, is for example, trimellitic anhydride, chloroformylphthalic anhydrides, organic dianhydrides, such as pyromellitic dianhydride, benzophenone dianhydride, ethylene glycol-trimellitate anhydride, and dianhydrides resulting from the reaction between trimellitic anhydride and organic diamines defined hereinafter, etc.

Included among the organic diamines which can be employed are for example, $C_{2-8}$ alkylene diamines, meta phenylene diamine, and diamines having the formula, (3) 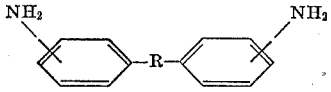

where R is a divalent radical selected from the class consisting of $C_{1-3}$ alkylene, carbonyl, oxygen, sulfone, silyl, siloxane, etc. Included by the amide acid units having the characteristic units of Formula 1, which can be made by forming the polyamide acid from the above described organic anhydride and organic diamine are for example,

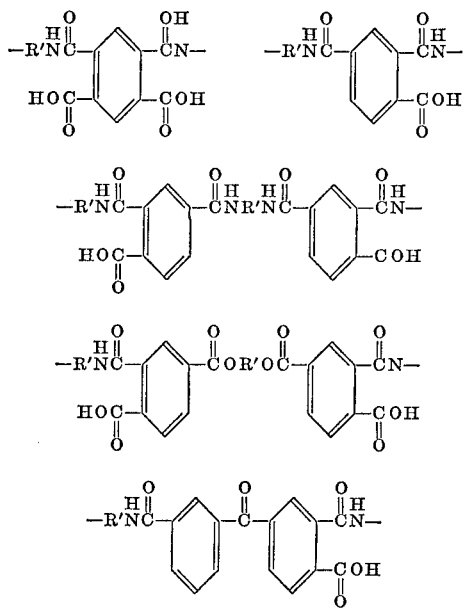

where R' can be selected from $C_{2-8}$ alkylene radicals,

and divalent organo radicals derived from organic diamines of Formula 3.

Included by the polar organic solvents which can be employed in the present invention are for example, N,N-dimethylformamide, N,N-dimethylacetamide, N,N - diethylformamide, N,N-diethylacetamide, N,N - dimethylmethoxy acetamide, N-methyl caprolactam, dimethylsulfoxide, N-methyl-2-pyrrolidone, tetramethyl urea, dimethylsulfone, tetramethylene sulfone, N - methylformamide, N-acetyl-2-pyrrolidone. In addition, other diluent solvents substantially inert during the practice of the method can also be utilized, such as hydrocarbons, alcohols, ethers, etc.

Included among the bases which can be utilized in the practice of the invention to partially neutralize the carboxy radicals of the above described polyamide acid are for example, any organic or inorganic bases which will facilitate the electrodeposition of the polyamide acid. For example, there can be employed hydroxides of alkali metals and tetraorgano ammonium radicals. Included among the alkali metal bases are alkoxides and aryloxides. Included by the bases which can be employed are for example, alkali metal hydroxides, such as sodium, potassium, lithium, etc.; tetraalkyl ammonium hydroxide, such as tetramethyl, tetrabutyl, etc., alkoxides such as sodium methoxide, potassium ethoxide, etc., phenoxides, such as sodium phenoxides, potassium phenoxides, etc. In addition, organic bases such as guanadine, etc., and alkali metal salts of weak acids having acid dissociation constants of $10^{-7}$ or less, which produces alkali metal hydroxide in situ in aqueous solutions also can be employed. Water soluble organic amines, such as for example, pyridine, dimethylethanolamine, triethylamine, diethylamine, morpholine, etc. or ammonium compounds selected from ammonia or ammonium hydroxide, ammonium salts, etc. also can be used.

In the practice of the invention, deteriorated polyamide acid dispersions, which, as a result of chemical changes, are incapable of providing good quality polyamide films due to the large amounts of entrained solvent in the electrodeposit, are subjected to mechanical separation such as by centrifuging or filtering to recover the dispersed solids from the liquid phase.

The recovered solids can be recombined with the above defined organic solvents to provide for valuable electrocoating or dip-coating mixtures. The separated liquid phase, can be distilled to recover large amounts of organic solvent.

In particular instances after an extended shelf period, under ambient conditions, it has been found that recovered solids can provide for the production of electrocoating solutions which are stable for an extended period of time at ambient conditions while providing for a high coulomb yield. One possible explanation for this unusual combination of properties is that the recovered polyamide acid solid can become highly imidized during storage at ambient temperatures, which reduces the frequency of Formula 1 units along the polyamide acid chain. Nevertheless, a sufficient number of Formula 1 units are available to permit their conversion of Formula 2 units to provide for an electrocoatable polyamide acid mixture.

In order that those skilled in the art will be better able to practice the invention, the following examples are given by way of illustration and not by way of limitation. All parts are by weight.

EXAMPLE 1

A polyamide acid having an intrinsic viscosity of 0.9 dl./g. was prepared by the reaction of substantially equal molar amounts of 4,4'-methylene dianiline and benzophenone tetracarboxylic dianhydride in N-methylpyrrolidone solvent under substantially anhydrous conditions. The polyamide acid was partially neutralized with aqueous ammonium hydroxide providing for 0.33 meq. of base per g. of polymer. There was produced an aqueous polyamide acid dispersion having 4.9% polymer solids, 60.4% N-methyl pyrrolidone, and 34.7% water. The polymer had less than 1 mole percent of units of Formulas 1 and 2 imidized.

Various electrocoating tests were made under controlled conditions with the above aqueous polyamide acid dispersion and materials derived therefrom. A 1" wide copper foil anode strip and a 1" wide platinum cathode strip were attached to a jig, facing each other at ½" separation. The electrocoating bath was raised at controlled speed until the electrodes were immersed 1". Power supply was turned on before the electrodes were immersed in the bath, employing DC current held constant at 40 ma. for 1 minute after immersion. Current was then turned off and the bath was lowered at controlled speed. The anode strip was weighed to determine the amount of wet electrodeposit. After cure in the air-circulating oven for 1 minute at 125° C. and 5 minutes at 250° C. the anode strip was weighed again to determine the amount of electrodeposited polymer solids.

The above described aqueous polyamide acid dispersion was allowed to remain under ambient conditions for 1 day and then was electrodeposited by the above described procedure. There was obtained a deposit of .059 grams per coulomb and 32% of polymer solids in the deposit. After the 16th day under ambient conditions, it was found that the electrodeposition yielded only 7.2% of solids in the wet electrodeposit. The electrodeposit derived from the aqueous polyamide acid dispersion after the one day shelf period formed a smooth and glossy film having desirable insulating characteristics upon cure at 250° C. for 5 minutes. The film obtained from the electrodeposit after the 16th day shelf period, cured under the same conditions was mottled and uneven and unacceptable as an insulator enamel.

After remaining under ambient conditions for 21 days, the aqueous polyamide acid dispersion was then centrifuged for a period of about 8 hours at 4600G. There was obtained from 64 parts of the aqueous polyamide acid dispersion, 58.8 parts of a celar supernatant liquid and 4.9 parts of a semi-transparent rubbery solidus phase. Analysis of the two phases gave the following composition:

|  | Liquid phase | Solidus phase |
|---|---|---|
| Percent solids | 1.0 | 45 |
| Percent water | 36 | 15 |
| Percent NMP | 63 | 41 |
| Percent imidization | 0 | 32 |
| Meq. NH$_3$/g. solids | 2.1 | 0.16 |

The percent imidization and the meq. ammonia/g. of solids was calculated using a difference factor, after the residual carboxy/g. of solids in the recovered material was determined employing conventional titration techniques.

An electrocoating mixture in the form of clear solution was made by dissolving the 4.9 parts of the above solidus phase in 54.5 parts of N-methylpyrrolidone. Aqueous ammonium hydroxide along with distilled water was then added to the mixture with stirring. There was obtained an electrocoating solution having 2.4 percent by weight of solids, 63.6% by weight of N-methylpyrrolidone, and 34% by weight of water. The meq. of ammonia/g. of polymer was 0.55. Upon electrocoating the polyamide acid soluiton, it was found that the weight of wet deposit per coulomb was .075 part, having 25.4% of polymer solids, in the electrodeposit. The cured film was smooth and glossy. By contrast, electrodeposition of the original polyamide acid dispersion, which had remained at ambient conditions for 21 days, provided a solids content of less than 7.2% in the electrodeposit and mottled, uneven, cured film.

EXAMPLE 2

An aqueous dispersion was prepared from the polyamide acid of Example 1, which had 2.5% polymer solids, 48.7% N-methylpyrrolidone, 48.8% water, and 0.48 meq. NH$_3$/g. polymer. The effects of having the dispersion remain under ambient conditions over a period of from 1 to 50 days was determined by periodically electrodepositing polyamide acid from the aqueous polyamide acid dispersion in accordance with the procedure of Example 1. The electrodeposition results are shown in the following table.

TABLE II

| Shelf period (days at 25° C.) | Percent solids in wet deposit |
|---|---|
| 1 | 28.6 |
| 8 | 6.6 |
| 14 | 3.9 |
| 22 | 3.6 |
| 50 | 3.2 |

After remaining under ambient conditions for 230 days at 25° C., 120 parts of the aqueous dispersion was centrifuged in accordance with Example 1. There was obtained 5.5 parts of solidus phase, which contained 2.1 parts of polymer solids, found to be 50% imidized. An electrocoating composition in the form of a polyamide acid solution, was prepared from the aforementioned recovered solids consisting of 2.7% polymer solids, 50.2% of N-methylpyrrolidone, 47.1% water, and 0.384 meq. of NH$_3$/g. of polymer solids. Electrodeposition of the polyamide acid was effected in accordance with the previously described procedure, and upon cure of the electrodeposit as previously described there was obtained a smooth glossy adherent coating, having valuable insulating characteristics. The percent of solids in the wet deposit was found to be 34.8%.

Although the above examples are limited to only a few of the very many aqueous polyamide acid dispersions which can be employed in the method of the invention, it should be understood that any polyamide acids having units of Formulas 1 and 2 can be utilized.

What I claim and desire to secure by Letters Patent of the United States is:

1. A method of making an electrocoatable polyamide acid mixture from an aqueous dispersion of such polyamide acid consisting essentially of a dispersed phase and an aqueous organic solvent liquid phase which aqueous polyamide acid dispersion has deteriorated under ambient conditions rendering it unsuitable for forming an electrodeposit of at least 20% by weight solids, which comprises
   (1) effecting the mechanical separation of the dispersed phase from the aqueous organic liquid phase of the deteriorated aqueous polyamide acid dispersion, and
   (2) employing the mechanically separated dispersed phase of (1) with additional aqueous organic solvent and base.

2. A method in accordance with claim 1, where the polyamide acid is the product of reaction of benzophenone dianhydride and methylene dianiline.

3. A method in accordance with claim 1, where the polyamide acid is the reaction product of trimellitic anhydride and an organic diamine.

4. A method in accordance with claim 1, where said polyamide acid mixture is a solution.

5. The mechanically separated dispersed phase of the deteriorated polyamide acid dispersion of claim 1 in the form of partially imidized polyamide acid solids which can be employed after an indefinite period of time at ambient temperatures to make electrocoatable polyamide acid compositions capable of forming an electrodeposit of at least 20% by weight of solids.

References Cited

UNITED STATES PATENTS

| 3,703,493 | 11/1972 | Holub | 260—29.2 |
| 3,507,765 | 4/1970 | Holub | 204—181 |
| 3,528,937 | 9/1970 | Reynolds et al. | 260—29.2 |
| 3,575,923 | 4/1971 | Jones | 260—47 |
| 3,652,511 | 3/1972 | Vincent et al. | 260—78 |

LESTER L. LEE, Primary Examiner

U.S. Cl. X.R.

204—181; 260— 47 CP, 65, 78 TF